INVENTOR.
DONALD E. BARTHLOME

Oct. 20, 1970                D. E. BARTHLOME                3,534,407
                      SPACE SUIT PRESSURE STABILIZER
Filed Sept. 6, 1968                                  3 Sheets-Sheet 3
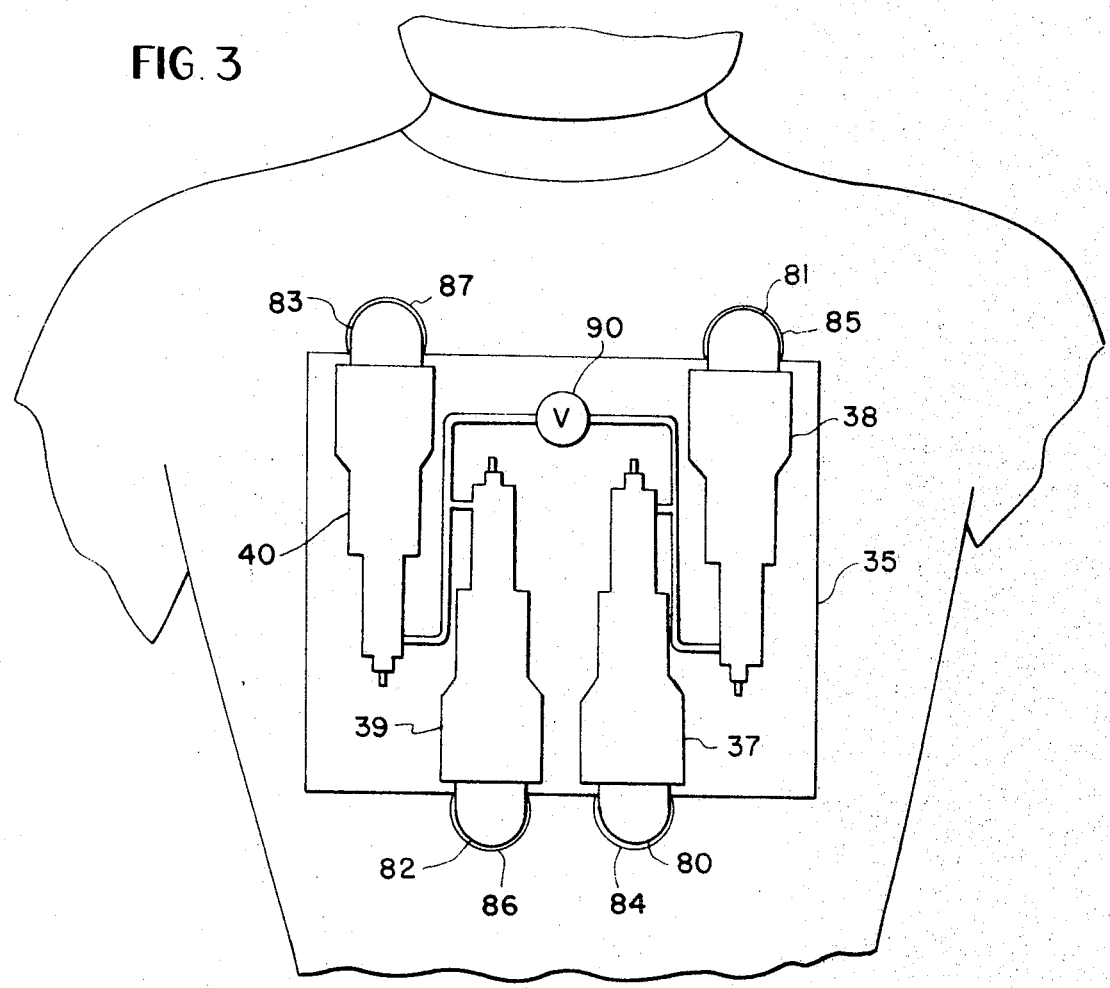
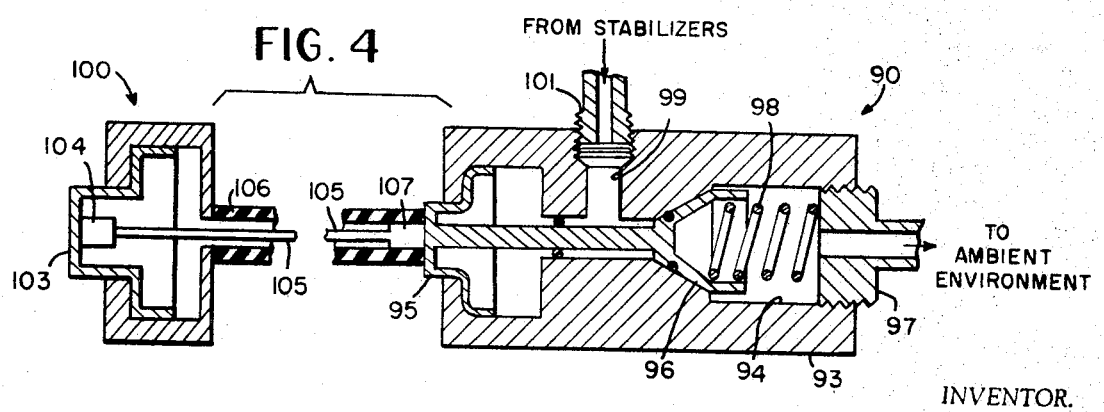
INVENTOR.
DONALD E. BARTHLOME
BY
ATTORNEYS

# United States Patent Office 3,534,407
Patented Oct. 20, 1970

3,534,407
SPACE SUIT PRESSURE STABILIZER
Donald E. Barthlome, Hampton, Va., assignor to the United States of America as represented by the Administrator of the National Aeronautics and Space Administration
Filed Sept. 6, 1968, Ser. No. 757,861
Int. Cl. A62b *17/00;* F16l *55/04*
U.S. Cl. 2—2.1                                                    6 Claims

ABSTRACT OF THE DISCLOSURE

In combination with an inflatable space suit having separable sections joined together, the improvement therewith comprising a pressure-volume compensator system serving to compensate for changes in pressure and volume of any non-constant volume joint of a space suit as the suit occupant bends his limbs. In operation the compensator receives the excess inflation volume forced out of the bent joint and returns this excess volume to the joint when the limb is again straightened without a corresponding change in suit pressure at the bent joint.

---

This invention was made by an employee of the National Aeronautics and Space Administration and may be manufactured and used by or for the Government of the United States of America without the payment of any royalties thereon or therefor.

This invention relates generally to a full pressure suit and relates more particularly to the combination of a space suit with a pressure-volume compensator system designed to maintain the pressurizing gas inside the inflatable space suit, or other full pressure suit, at a constant pressure and volume thereby eliminating the necessity for constant volume joints in the suit. Although the compensator of the present invention maintains the total volume of the space suit at a constant value, the system does not completely eliminate the energy requirements equivalent in magnitude to the pressure volume work involved when any nonconstant volume space unit joint is flexed or bent.

The present state of the art in space suit design requires that all joints be constructed such that mobility will not be impaired by fluctuations in the pressure of the contained inflation gas. Joints of this nature are simply termed constant volume joints. Their effect is the elimination of all pressure-volume work during flexure of the space suit, such for example, as encountered when walking or doing other work requiring the bending of his limbs during extravehicular activity (EVA) of an astronaut or space explorer.

The requirement that all joints in a space suit be of constant volume presents an expensive and formidable engineering design problem, the elimination of which would permit greater latitude when designing space suit joints for increased mobility.

Accordingly, it is an object of the present invention to provide a space suit pressure stabilizer for use with an inflatable space suit to minimize the energy required by an astronaut to bend his limbs during extravehicular activity when wearing the inflated space suit.

Another object of the present invention is a novel space suit pressure stabilizer serving to maintain the pressurizing gas inside a space suit at a constant pressure during movement of the space suit occupant wherein one or more of the joints of the space suit are not of constant volume.

Another object of the present invention is a pressure stabilizer which will automatically maintain the pressure of any contained fluid at a prescribed value relative to the ambient environment of the vessel containing the fluid when variations occur in the volume of selected areas of the vessel.

Another object of the present invention is to provide a pressure stabilizer which can maintain a constant prescribed pressure differential across a permeable or semipermeable member so as to either cause flow or an increase in flow of a fluid or fluids from the ambient environment through the member into a vessel to which the member is attached.

The foregoing and other objects are attainable in one aspect of the present invention by providing a space suit pressure stabilizer in fluid communication with the interior of an inflatable space suit wherein when any joint in the space suit is flexed so as to cause a momentary decrease in inflation medium volume within that joint, the displaced fluid in the bent joint will move along the path of least resistance prior to causing any increasing pressure in the affected joint to thereby enter the space suit pressure stabilizer which receives the increase in volume without causing any increase in pressure. When the bending moment is removed from the joint and the joint again straightened, the pressure stabilizer will force the excess volume of inflation medium received therein back to the now straight joint to compensate for changes in pressure and volume. Thus, the astronaut may bend his limbs without changing the pressure-volume relationship of the entire system.

The pressure stabilizer of the present invention serves as a pressure-volume compensator for minimizing the effects of momentary pressure-volume changes occurring at selected points in a closed pressure system and serves to stabilize the pressure at these points to that of the system when the force causing the momentary pressure-volume change is removed.

This is readily accomplished according to the present invention by providing a space suit pressure stabilizer in a backpack arrangement connected to and in fluid communication with the interior of the space suit. In operation, the pressure stabilizer is pressurized at the same pressure as the interior of the space suit. The interior of the pressure housing is divided into first and second chambers by a suitable flexible diaphragm. A slidable piston is secured to one face of the flexible diaphragm and is slidably movable in the first chamber. A suitable valve connects the first chamber to the ambient environment of the space suit system with the valve being selectively operable by the suit occupant to expose the chamber to the ambient environment of the system or to keep the chamber sealed.

The second chamber of the space suit pressure stabilizer unit is in fluid communication with the closed pressure space suit system and is pressurized at the same pressure as the space suit. A pair of constant force springs are fixedly positioned within the second chamber and attached to and movable with the piston member that is positioned in the first chamber. The force exerted by the constant force springs on the piston is equal to the product of the desired suit pressure and the effective area of the piston face. Thus, when the space suit is pressurized the suit occupant would actuate the valve to cause the pressure in the first chamber to become equal to that of the ambient environment of the system which, under normal space conditions, would essentially be the vacuum of space. As a result, the slidable piston member has no net force acting on it and any subsequent increase in suit pressure or increase in pressurizing volume within the second chamber will cause movement of the piston member further into the first chamber.

Accordingly, when the space suit occupant bends any of his limbs, thereby causing a momentary decrease in volume in the suit joint due to bending of the limb, the displaced fluid in the bent joint will move along the path of least resistance prior to causing any increase in pressure in the affected joint. This displaced volume enters the second chamber of the space suit pressure stabilizer unit and causes an increase in volume in this chamber with the increase in volume being received without any increase in pressure occurring in the system due to the movement of the piston into the first chamber. The flexible seal member permits this movement to thereby effectively increase the volume of the second chamber. When the bent joint is again straightened the restraining spring members serve to move the slidable piston and the flexible seal back to their original position to thereby reduce the effective volume of the second chamber to its original size. The return movement of the piston and the flexible seal forces the excess volume of inflation medium contained in the second chamber back to the joint being straightened.

A more complete appreciation of the invention and many of the attendant advantages thereof will be readily apparent as the same becomes better understood by reference to the following detailed description when considered in connection with the accompanying drawings wherein:

FIG. 3 is a view of a pressure stabilizer system employed in a backpack assembly and utilizing four piston unit pressure compensators with parts schematically shown, parts broken away and parts omitted for clarity.

FIG. 4 is a part sectional view of the control and valve for releasing pressure in the pressure compensators shown in FIG. 3.

Figure 1:
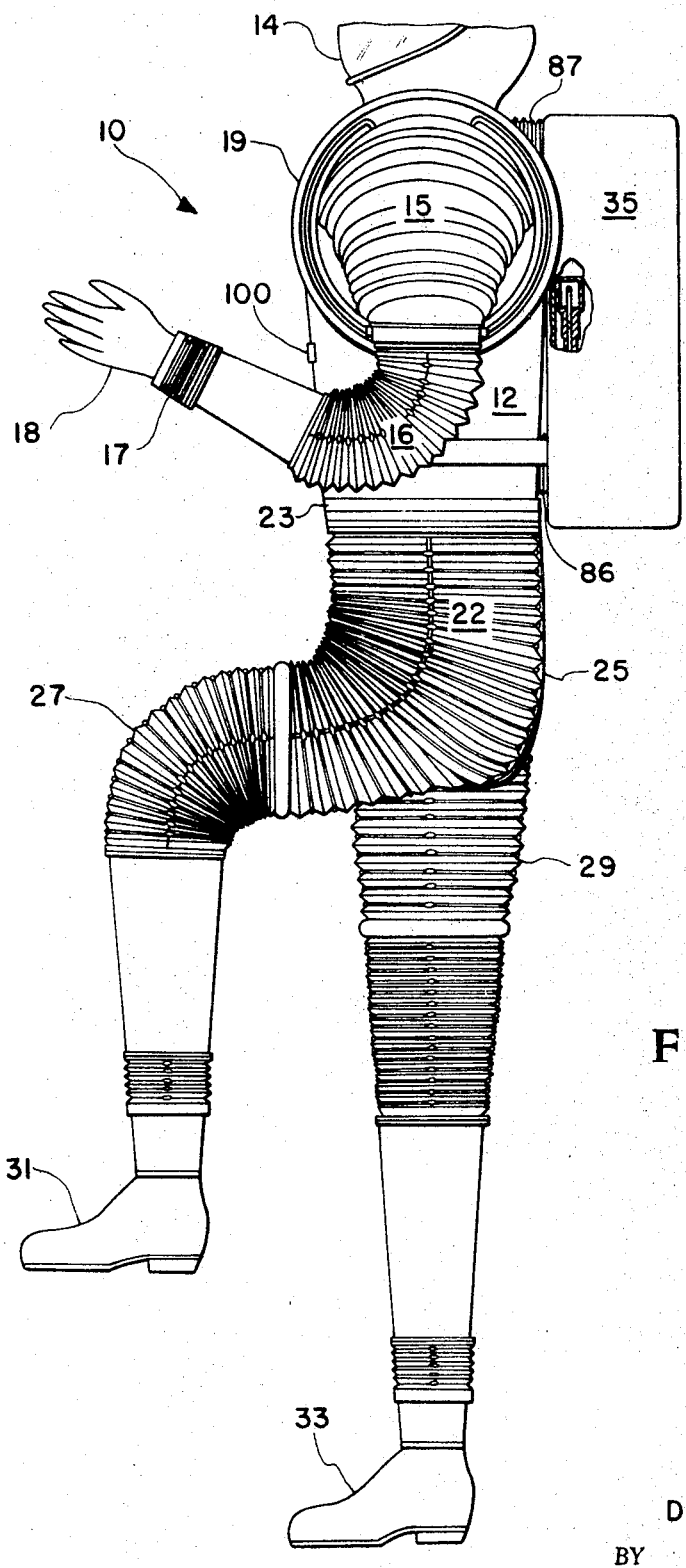
FIG. 1 is a side view of an anthropomorphic type space suit with a pressure stabilizer combination according to the present invention with parts thereof broken away.

Referring now more particularly to the drawings wherein like reference numerals designate identical or corresponding parts throughout the several views and more particularly to FIG. 1, there is shown a space suit generally designated by reference numeral 10. Space suit 10 includes a rigid vest section 12 serving to cover the upper torso of a suit occupant; an airtight helmet 14 secured to vest 12 by a suitable rotatable seal, not shown; a pair of arm sections, one of which is shown in FIG. 1 and designated by reference numeral 15 and secured to vest 12 by rotatable seal 19; and, a lower body section 22 secured to the lower end of vest 12 by a positive rotatable seal joint 23. Arm 15 includes elbow joint 16, wrist section 17 and glove 18. The other arm not shown in this figure is of identical construction. Lower body section 22 includes a flexible hip encircling portion 25 and a pair of leg sections designated by reference numerals 27 and 29. Each of leg sections 27 and 29, is provided with a flexible knee and ankle segment, not designated. A pair of suitable inflatable boots 31 and 22, respectively, are provided at the end of leg sections 27 and 29. Space suit 10 is an anthropomorphic type space suit constructed of either hard or soft materials or any combination thereof and containing one or more joints which are not of constant volume.

The pressure stabilizer or compensator system of the present invention is carried by a suitable backpack 35 secured in a conventional manner to the back of space suit 10. In addition to carrying the pressure stabilizer, backpack 35 houses, in a conventional manner, suitable breathing and cooling mechanism, not shown in the interest of clarity. In the illustrated embodiment of the present invention the pressure stabilizer system includes four individual piston unit assemblies as designated by reference numerals 37, 38, 39 and 40 (FIG. 3).

Figure 2:
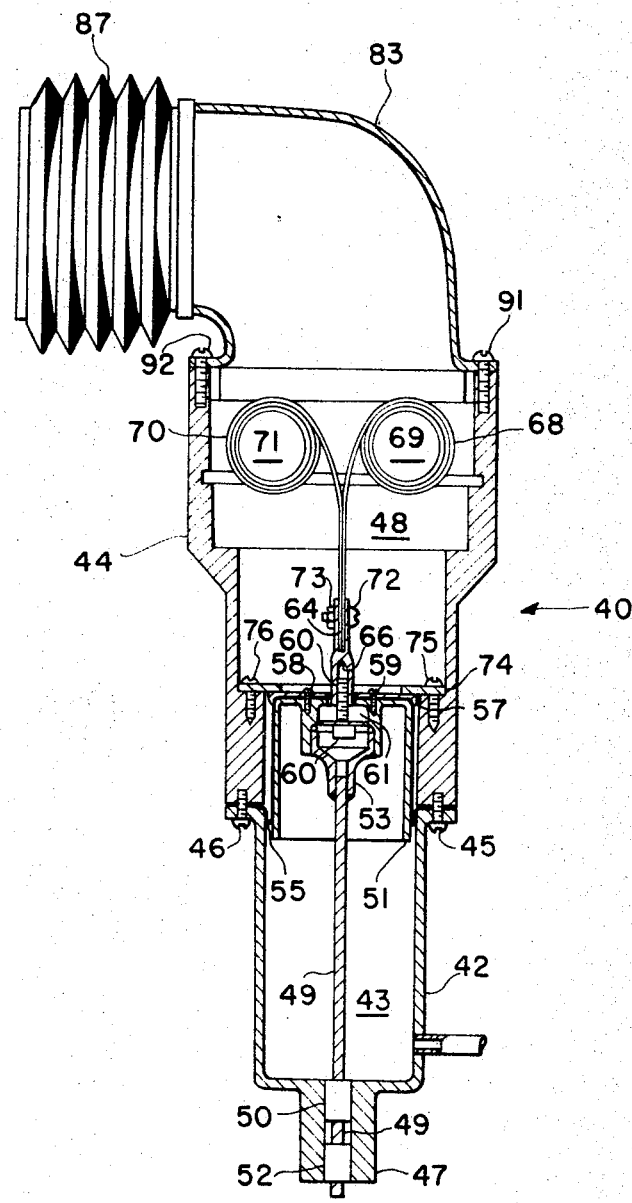
FIG. 2 is an enlarged sectional view of one piston unit assembly of a pressure stabilizer system according to the present invention.

Referring now more particularly to FIG. 2, the details of one of the piston unit assemblies will now be described, it being understood that the specifics of each of the other units employed is identical to that shown and described in reference to FIG. 2. As shown in FIG. 2, stabilizer unit 40 consists of two essentially tubular shaped components as designated by reference numerals 42 and 44. The tubular components 42 and 44 are secured together by suitable threaded bolts or the like, two of which are shown in the figure and designated by reference numerals 45 and 46. The base of tubular section 42 terminates in a hub section 47 with a cylindrical shaft 49 having one end thereof slidably received by spaced linear ball bearings 50 and 52 positioned in hub 47. Bearings 50 and 52 serve to maintain concentricity between a piston member 51, which is fixed at the other end of shaft 49, and the tubular components 42 and 44.

Piston 51 is normally positioned substantially within tubular component 44 opposite to hub 47 with the open end of the cup-shaped piston 51 facing hub 47. A centrally disposed structure 53 is provided within piston 51 and serves to fixedly engage piston 51 to shaft 49 for guiding the movement of piston 51 within tubular component 42. A gastight seal is provided between piston 51 and the interior walls of tubular components 42 and 44 of stabilizer cylinder unit 40 in the form of a "Bellofram" or other suitable rolling diaphragm and as designated by reference numeral 55. Bellofram is a trade name for a silicone elastomer made without fabric reinforcement. The ends of diaphragm 55 are secured between the abutting faces of tubular components 42 and 44 by bolts 45 and 46 and others not shown in the drawing. A circular plate 57 is provided along the base of piston 51 and secured thereto by way of screws 58 and 59 and others, not shown, and serves to secure diaphragm 55 to the base of piston 51.

An elongated substantially tubular extension 64 extends from piston 51 into chamber 48 of tubular member 44 when piston 51 is in the position shown in FIG. 2. The end of tubular extension 64 adjacent piston 51 is provided with a threaded opening 66 which serves to receive a bolt 60 that passes through a thrust bearing 61 and serves to secure extension 64 to thrust bearing 61 which in turn is supported by piston 51. The opposite end of tubular extension 64 terminates in a substantially flat bifurcation with a counterbore therethrough and serves to receive the ends of a pair of constant force springs 68 and 70. A suitable bolt, as designated by reference numeral 72, passes through the bifurcation of tubular extension 64 and the ends of constant force springs 68 and 70 and, with tap 73, serves to secure these members together. Thus, springs 68 and 70 can exert a force but no torque on piston 51. A washer 74 is secured at the base of chamber 48 in tubular component 44 by way of screws 75 and 76 and others, not shown, and serves to prevent piston 51 from moving further within chamber 48. Springs 68 and 70 are wound around suitable drums 69 and 71, respectively, with the drum ends being mounted in suitable radial ball bearings that are attached to the side walls of tubular component 44 in a conventional manner.

Constant force or negator springs of this type are well known and serve as a device which provides a constant tension for any degree of extension within the desired range of the spring. These springs may consist of one or more prestressed strips of flat spring stock coiled tightly around its respective bushing and are readily uncoiled by applying a constant force, the magnitude of which depends upon the geometry and dimension of the coil. The work done in unwinding the coil spring is stored as potential energy in the straightened material. This energy is equal in magnitude to the product of the gage pressure in chamber 48 and any change in volume of chamber 48 resulting from a movement of piston 51.

The open end of tubular component 44 adjacent springs 68 and 70 is attached to an elbow 83 leading to flexible duct 87 or other suitable connecter element so as to provide fluid communication between chamber 48 and the interior of the space suit such that when the space suit is inflated, chamber 48 will be under the same pressurization as the interior of the space suit, as will be more fully explained hereinafter. Suitable screws 91 and 92, and others not shown, serve to secure elbow 83 to unit 40.

As shown more particularly in FIG. 3, the embodiment described utilizes a total of four pressure stabilizer units as designated by reference numerals 37, 38, 39 and 40. Each of these units is of identical construction to that of unit 40 shown in FIG. 2 and described at length hereinabove with the four units being arranged in a side to side relationship. Each of the units 37, 38, 39 and 40 is in fluid communication with the interior of the space suit through elbows 80, 81, 82 and 83 for respective units 37, 38, 39 and 40 and their respective flexible ducts. A portion of duct 86 for unit 39 and duct 87 for unit 40 are shown in FIG. 1. Thus, when space suit 10 is pressurized, chamber 48 in unit 40 and an identical chamber in each of the other units will be pressurized to the same pressure as that for the space suit.

As mentioned hereinbefore, chamber 42, in unit 40, and an identical chamber in each of the other three units, is connected by way of a suitable tubing and valve arrangement, schematically shown in FIG. 3 and designated by reference numeral 90, to the ambient environment of the space suit. Valve 90 is controlled by the astronaut or space suit occupant by way of control 100 positioned on the front of vest section 12 (FIG. 1) so that he can selectively open and close the valve to expose chamber 43 and the other similar chambers to the ambient environment of the space suit. Valve 90 includes a valve housing 93 having a longitudinal stepped opening 94 formed therethrough. A push button 95 having an integrally attached valve stem which terminates in a valve seat 96, closes one end of opening 94. Suitable O-ring seals, not designated, are provided on the valve stem and valve seat 96 to provide a seal between these parts and respective portions of opening 94. The other end of opening 94 serves to receive a threaded plug 97 which maintains a spring 98 in biased contact with valve seat 96. Plug 97 is also provided with a through opening as designated by the legend to provide communication between opening 94 and the ambient environment. A side port 99 extends through the side wall of valve housing 93 from opening 94 to connect this opening, by way of tapped plug 101, to the tubing extending from chamber 43 of each of the stabilizer units.

Control 100 utilizes a simple push button arrangement including a housing 102 containing a push button 103. A suitable bushing 104 is welded or otherwise integrally attached at one end to the interior face of push button 103 and has a flexible cable 105 integrally attached thereto. Cable 105 is formed of spring steel, or the like, and is adapted to freely slide through housing 102 and a protective sleeve 106 when a force is applied to the end thereof as by depressing button 103. The other end of cable 105 terminates in a bushing 107 which is welded or otherwise integrally attached to push button 95 of valve 90. The flexible construction of cable 105 and sleeve 106 permits control 100 to be positioned at essentially any point on suit 10 that is convenient for the astronaut to reach. In some instances, it may also be desirable to position valve 90 on the front of vest section 12 and eliminate the need for the flexible cable control since the astronaut could readily depress button 95 directly. This would be easily accomplished by merely extending the tubing leading from the stabilizer units 37, 38, 39 and 40 to the front of the vest section 12.

The purpose of valve 90 is to prevent escape of gas from suit 10 in the event a gas leak develops in one or more of the rolling diaphragms 55 and to enable the suit occupant to evacuate chamber 43 of each of the stabilizer units. Evacuation of chambers 43 insures that, in the event gas diffuses through diaphragm 55 into chamber 43 so as to jeopardize the efficiency of the stabilizers 37, 38, 39 and 40, this gas can be readily discharged to the ambient environment. When the suit occupant depresses button 103 of control 100, the flexible spring steel cable 105 will slide through sleeve 106 to transfer this force to button 95. As button 95 is depressed, valve seat 96 will also be depressed to permit any gas in chambers 43 to flow, through the tubing leading to tapped plug 101, side port 99, opening 94 and threaded plug 97 and pass to the ambient environment. Upon release of button 103, spring 98 returns valve seat 96 to the closed position with the valve stem transmitting this force to button 95, cable 105 and button 103 to return all parts to the positions as shown in FIG. 4.

Once chamber 43 is equalized in pressure to the ambient environment valve 90 is closed to prevent loss of suit pressure in the event diaphragm 55 loses its sealing characteristics. Thus, in the ambient environment of space, vacuum conditions would exist and any air remaining in chamber 43 and its counterparts would be expelled to space to place chamber 43 and its counterparts under vacuum conditions. Piston 51 and its counterparts in the other units would remain essentially in the position shown in FIG. 2 due to the action of negator spring 68 and 70 thereon with chambers 48 being pressurized to the same pressure as the interior of the space suit. For space applications, the pressure differential across diaphragm 55 would be approximately equal to the pressure of the gas in the space suit.

Upon bending of any of his limbs, the astronaut would reduce the volume available in the space suit joint at the bent limb to thereby force some of the pressurizing fluid along the course of least resistance into any one or all of stabilizer cylinders or units 37, 38, 39 and 40. This excess pressure being received by chamber 48 of the respective unit would tend to cause an increase in pressure within the cylinder, but due to the action of springs 68 and 70 holding piston 51 in position, this excess pressure would force piston 51 further into chamber 43 to thereby effectively increase the volume of chamber 48 which would receive the excess volume of pressurizing fluid without causing any increase in pressure within the closed space suit system. When the bent limb is again straightened by the astronaut this same spring force would cause the movement of piston 51 back to its original position as shown by FIG. 2 to thereby force the excess volume of inflation medium from chamber 48 back to the now straightened limb.

The piston and spring movements in each of the other units is identical to that described for unit 40. For a minor bend in one of the limbs it is possible that only the two units nearest the joint would be significantly affected while all four units would be affected when both arms and both legs are bent simultaneously.

Although the invention has been described with reference to the use of four stabilizer units, it is to be understood that this is for illustrative purposes only and is not essential to the operation of the present invention. Thus, one, two, three, four or more stabilizer units may be employed within any complete system as so desired, and as conditions dictate, such that the total design chamber area increase will accommodate any inflation medium force from any of the bent joints without a corresponding increase of pressure within the system. No specific materials have been mentioned for the construction of space suit 10, it being understood that any conventional inflatable space suit is applicable with the stabilizer-compensator system of the present invention. Accordingly, it is to be understood that the invention has been described in connection with a specific exemplary embodiment thereof and that this embodiment is given by way of illustration only and is not to serve as a limitation on applicant's invention. Accordingly, changes and modifications in details of the invention described herein can obviously be made by those skilled in the art without departing from the spirit and scope of the invention as defined in the appended claims. It is therefore to be understood that within the scope of the appended claims that the invention may be practiced otherwise than as specifically described,

What is claimed as new and desired to be secured by Letters Patent of the United States is:

1. An improved inflatable space suit having separable sections joined together and comprising:
   a rigid vest section adapted to cover the upper torso of a suit occupant,
   an airtight helmet adapted to enclose the head of a suit occupant,
   a rotatable seal securing said helmet to said vest section,
   a pair of arm sections for said vest section,
   a pair of individual rotatable seals securing said arm sections to said vest section,
   a glove section at the end of each said arm section,
   a rotatable seal securing one of said glove sections to each said arm section,
   a lower body section at the lower end of said vest section,
   a rotatable seal securing said lower body section to said vest section,
   said lower body section including a flexible hip encircling portion and a pair of leg sections,
   a boot secured to each said leg section,
   a rotatable seal serving to secure one boot to each said leg section,
   each of said arm and said leg sections being constructed of a flexible material to permit normal limb bending movement by a wearer of said suit,
   a backpack arrangement secured to the vest section of said suit,
   compensator means carried by said backpack arrangement and serving to compensate for changes in inflation medium pressure and volume of the arm and leg sections upon bending of the limbs by the suit occupant,
   said compensator means including a plurality of compensator units with each said unit having:
   a housing,
   first and second chambers formed in said housing,
   a slidable piston member movable in said first chamber of said housing,
   said first chamber having valve means connected thereto and selectively operable by the suit occupant to expose the chamber to the exterior environment of the suit or to keep the chamber area sealed,
   said second chamber being in fluid connection with the interior of said suit,
   said second chamber serving to receive any change in inflation medium volume experienced as the wearer of said suit bends his limbs to thereby decrease the volume of air in that respective joint,
   means restraining said piston adjacent said second chamber of said housing under normal suit pressure but permitting said piston to slidably move into said first chamber to compensate for the increased volume of inflation medium moving into said second chamber as the wearer of said suit bends his limbs,
   said means restraining said piston serving to move said piston back to its normal position adjacent said second chamber as the wearer of said suit straightens his limbs from the bent position with the force of said piston and its restraining means acting on the suit inflation medium to thereby force the normal volume of inflation medium back to the previously bent limb area.

2. The improved space suit of claim 1 including flexible seal means serving to divide said compensator housing into said first and second chambers, said seal means being movable with said piston.

3. The improved space suit of claim 1 wherein said means restraining said piston adjacent said second chamber of said compensator housing comprises a pair of constant force springs.

4. The improved space suit of claim 1 wherein said means restraining said piston adjacent said second chamber is housed within said second chamber.

5. A pressure-volume compensator for minimizing the effects of momentary pressure-volume changes occurring at selected points in a closed pressure system and serving to stabilize the pressure at these points to that of the system when the force causing the momentary pressure-volume change is removed, comprising in combination with a closed pressure system:
   a housing,
   first and second chambers formed in said housing,
   a flexible diaphragm dividing said housing into said first and second chambers,
   a slidable piston movable in said first chamber,
   valve means connected to said first chamber and selectively operable by an operator to expose the chamber to the ambient environment of the system or to keep the said first chamber sealed,
   said second chamber being in fluid communication with the closed pressure system,
   restraining means positioned within said second chamber and connected to said piston,
   said restraining means serving to maintain said piston adjacent said second chamber at the design pressure of said closed pressure system and to permit restrained sliding movement of said piston when the pressure in said second chamber is momentarily increased as the result of an increase of pressure at some point in the closed system causing an increase in pressurizing fluid volume in said second chamber and when the force causing said increased pressure is removed said restraining means assists in forcing of the piston back to its original position to thereby force the excess pressurizing fluid from said second chamber and stabilize the closed pressure system at its design pressure.

6. In combination with an inflatable space suit having bendable joints for the arms and legs of a suit occupant wherein the space suit joints, when bent, will undergo a momentary increase in pressure with a corresponding momentary reduction in volume of inflation medium, the improvement therewith comprising:
   a pressure-volume compensator for use with said suit, and serving to receive an increased volume of inflation medium during bending of the arms and legs of the space suit occupant and to return the excess volume received when the bent arm or leg is again straightened to thereby maintain substantially a constant pressure-volume ratio at all points in the space suit system at all times,
   said pressure-volume compensator including a housing,
   first and second chambers formed in said housing,
   a flexible seal dividing said housing into said first and second chambers,
   a piston member slidably disposed in said first chamber and secured to one side of said flexible seal,
   said first chamber being selectably in communication with the ambient environment of said suit and sealed from external pressure forces,
   restraining means serving to restrain said piston and said flexible seal adjacent said second chamber during normal pressurization of said suit,
   said restraining means permitting flexible seal and piston movement in said first chamber to thereby effectively increase the volume of said second chamber when the pressure in said second chamber tends to increase due to the volume of pressurized fluid in said second chamber increasing,
   said second chamber being in fluid communication with the interior of said suit and normally being pressurized with said suit,
   whereby, when the suit occupant bends any of his limbs the displaced fluid in the bent joint will move along the path of least resistance prior to causing any increasing pressure in the affected joint to thereby enter said second chamber in said pressure-volume compensator and cause an increase in volume in said second chamber with said increase in volume being received without any increase in pressure occurring in the system due to the movement of said piston and said flexible seal in said first chamber to thereby effectively increase the volume of said second chamber and when the bent joint is again straightened the restraining means serves to move said piston and said flexible seal back to their original position thereby reducing the effective volume of said second chamber to its original size, and movement of said piston and said flexible seal by said restraining means forcing the excess volume of inflation medium contained in said second chamber back to the joint being straightened.

References Cited
UNITED STATES PATENTS 2,939,148   6/1960   Hart et al. _____ 2—2.1
3,075,558   1/1963   Von Forell _____ 138—31 XR JORDAN FRANKLIN, Primary Examiner G. H. KRIZMANICH, Assistant Examiner U.S. Cl. X.R.

138—31